(12) United States Patent
Babej (10) Patent No.: US 7,581,300 B2
(45) Date of Patent: Sep. 1, 2009

(54) METHOD FOR THE ATTACHMENT OF A FUNCTIONAL ELEMENT

(75) Inventor: Jiri Babej, Lich (DE)

(73) Assignee: Profil Verbindungstechnik GmbH & Co. KG (DE)

( * ) Notice: Subject to any disclaimer, the term of this patent is extended or adjusted under 35 U.S.C. 154(b) by 541 days.

(21) Appl. No.: 11/284,060

(22) Filed: Nov. 21, 2005

(65) Prior Publication Data

US 2006/0117546 A1 Jun. 8, 2006

Related U.S. Application Data

(62) Division of application No. 10/019,930, filed on Jun. 18, 2002, now Pat. No. 6,994,486.

(51) Int. Cl.
*B23P 11/00* (2006.01)

(52) U.S. Cl. .............................. 29/505; 29/509; 29/521; 29/525.05; 403/282; 403/285; 411/176; 411/381

(58) Field of Classification Search ................ 29/432.1, 29/432.2, 505, 509, 524.1, 525.02, 525.03, 29/525.05, 525.06, 525.11, 34 B, 798, 243.5, 29/243.53, 283.5, 521; 72/470, 471, 474, 72/465.1, 466.4, 466.5; 403/252, 282, 274, 403/284, 285; 411/107, 181, 183, 381, 501, 411/34, 176, 177
See application file for complete search history.

(56) References Cited

U.S. PATENT DOCUMENTS

| 3,624,867 A | 12/1971 | Reynolds ........................ 24/73 |
| 4,064,617 A | 12/1977 | Oaks .......................... 29/432.1 |
| 4,574,453 A | 3/1986 | Sawdon ....................... 29/432 |
| 5,339,509 A | 8/1994 | Sawdon et al. ................. 29/432 |

FOREIGN PATENT DOCUMENTS

| DE | 19647831 | 5/1998 |
| EP | 0028019 | 10/1980 |
| EP | 0686458 | 6/1995 |
| GB | 1532437 | 11/1978 |
| GB | 2152862 | 8/1985 |

*Primary Examiner*—Jermie E Cozart
(74) *Attorney, Agent, or Firm*—Hershkovitz & Associates, LLC; Abraham Hershkovitz

(57) ABSTRACT

A method for placing a functional element, especially a fastening element, in an especially liquid-tight and/or gastight manner, on a metal part. In this method a functional element provided with a hollow head segment is pressed against the metal part (212) witch is supported by a die (214). The metal material is deformed into an undercut (324) by deforming the head segment when simultaneous deformation of the hollow head segment occurs and the metal part is shaped in a forming area defined by parts (216) of the die (214). The parts (216) are kept in a stationary position during the forming process but are partially removed from the die to enable the functional element which is placed on the metal part (212) to be extracted. The invention also relates to a die, a functional element, an assembly element and a die arrangement.

12 Claims, 12 Drawing Sheets

FIG. 5H
METHOD FOR THE ATTACHMENT OF A FUNCTIONAL ELEMENT

This application is a divisional of prior application Ser. No. 10/019,930 filed Jun. 18, 2002 now U.S. Pat. No. 6,994,486 B1.

FIELD OF THE INVENTION

The invention relates to a method for the attachment, in particular for the liquid-tight and/or gas-tight attachment, of a functional element, in particular a fastener element, to a sheet metal part.

The invention further relates to a die and a functional element which can be used in the method in accordance with the invention and to a component assembly which can be manufactured by the method in accordance with the invention.

DESCRIPTION OF RELATED ART

Functional elements such as nuts or bolts are attached to sheet metal parts in the manufacture of automobiles, for example, in order to allow the most varied components to be joined to the sheet metal parts.

A method of the initially named kind for the attachment of a functional element to a sheet metal part is known from DE 196 47 831 A1 in which sheet metal material is brought into hooked engagement with an undercut feature of the functional element by means of a one-piece reforming die against which the functional element is pressed with the sheet metal part lying therebetween.

Furthermore, it is known to connect metal sheets to one another without using additional joint elements by pressing the metal sheets onto a die and drawing them by means of a plunger in the direction of a fixed anvil. Moveable lamella of the die, which are arranged to the side of the anvil, yield and move radially outwardly when the lower sheet metal part reaches the anvil. In this way a round collar is created which locks the metal sheets to one another.

SUMMARY OF THE INVENTION

The object of the invention is to provide a method of the initially named kind and apparatuses of the initially named kind, that is a die, a functional element, a component assembly consisting of a sheet metal part and a functional element attached thereto and a die arrangement, which ensure a good joint, which is as easy to manufacture as possible, between a sheet metal part and a functional element.

This object is satisfied in accordance with the invention methodwise in that by the functional element provided with a hollow head part being pressed against the sheet metal part supported by a die and, with a simultaneous deformation of the hollow head part and a reforming of the sheet metal part into a reforming space defined by shaped parts of the die, the sheet metal material is formed into an undercut made by deformation of the head part, with the shaped parts being immovably held during the reforming, but being partly lifted out of the die for the removal of the functional element attached to the sheet metal part.

The attachment of the functional element to the sheet metal part is made in accordance with the invention by a reforming joining technique in which the undercut is not present in the head part of the functional element from the start, but is only created during the attachment thereof by deformation of the head part. Although both the sheet metal part and the functional element undergo substantial deformation in this process, it is surprisingly possible to achieve a low-cost and reliable method which provides a high quality joint between the sheet metal part and the functional element and which can be performed in such a way that the sheet metal part is not pierced.

As a result, the sheet metal part is still absolutely liquid-tight and/or gas-tight following the attachment of the functional element and can thus also be used in environments in which such properties are indispensable.

It is, however, also possible to work with a pre-pierced sheet metal part if the functional element requires this or makes it meaningful, for example if the functional element is to be realized as a nut element, which is possible in principle.

The functional elements can be manufactured either in a known manner by cold forming or by other favourably priced methods.

The shaped parts of the die remain in a fixed position during the reforming, but are movably supported for the removal of the sheet metal part with the attached functional element. They can be replaced as parts subject to wear at favourable cost without having to replace the whole die. The dies can also be manufactured at a favourable price.

A preferred die for the performance of the method is characterized by the following features: by a hollow body having an end face which is provided to support a sheet metal part and which merges into a space receiving an abutment element via a conically tapering wall, with the abutment element being spaced from the conically tapering wall to form an annular gap of wedge-shaped cross-section and with the end face of the abutment element adjoining the end face of the hollow body being set back from the end face of the hollow body and having a dome-like projection surrounded by an annular surface, and further characterized by a plurality, preferably from two to eight, in particular of four, shaped parts, preferably shaped parts of substantially the same design, which are arranged around a longitudinal axis of the die in the wedge-shaped annular gap and are supported both on the conical wall and also on the abutment element and which project into the shaped projections of the shaped parts through a reforming space formed between the shaped parts and the set-back end of the abutment element.

The functional element in accordance with the invention is characterized in that the functional element comprises a shaft part and a head part designed for a riveted joint to a panel member, in particular a sheet metal part, in that at least the head part is made hollow and preferably has at least substantially the same outer diameter as the shaft part.

The component assembly manufactured in accordance with the invention is designed such that a hollow head part of the functional element is deformed in order to form two annular bulges which project radially outwardly, which are spaced from one another and between which there is an undercut in which the sheet metal material is received in a form-locked manner and such that the sheet metal part extends into the undercut of the functional element.

The present invention is furthermore directed to a special plunger arrangement which is, in particular, designed to perform the insertion of functional elements without the risk of deforming the shaft part and, in particular, its thread cylinder. For this purpose, the plunger arrangement in accordance with the invention is characterized by the following features:

by an outer plunger by an inner plunger which is displaceably arranged with respect to the outer plunger within a plunger passage of the outer plunger between a receiving position for the functional element and an insertion position for the functional element, with the functional element being able to be inserted into the plunger passage preferably from the side, in the receiving position, and with the head part of the functional element projecting out of the plunger arrangement when in the insertion position;

and by at least two segments supported by the outer plunger which preferably have shaped features at an inner side which can engage into the shaped features of the shaft part of the functional element and which are movable between an open position remote from the shaft part of the functional element and a closed position in engagement with the shaped features of the shaft part.

Further preferred embodiments of the method in accordance with the invention and of the die in accordance with the invention, of the functional element in accordance with the invention, of the component assembly in accordance with the invention and of the plunger arrangement in accordance with the invention, which each contribute to satisfying the underlying object of the invention, are set forth in the claims, the description and the drawing.

BRIEF DESCRIPTION OF THE DRAWINGS

The invention is described below by way of embodiments with reference to the drawing. There are shown.

DETAILED DESCRIPTION OF THE INVENTION

The attachment of a functional element to a sheet metal part is nowadays normally performed in the working of sheet metal by means of a press or of a robot by the cooperation of a setting head and a die, with the die being mounted, for example, in a lower tool of a press, while the setting head is attached to an upper press tool or to an intermediate plate of the press. Other attachment possibilities are also possible. The die can, for example, be attached to the intermediate plate of the press and the setting head to the upper tool of the press. Reversed arrangements are also feasible where the die is attached to the upper tool and the setting head to the lower tool of the press or to the intermediate plate. It is, in addition, not absolutely necessary for the die and the setting head to be in a press; they could, for example, be moved towards and away from one another by a robot, or represent parts of a different kind of tool.

The respectively used setting head, or the tool associated with it, has, in a manner known per se, a frequently tubular hold down member which clamps the sheet metal part against the stationary end face of the die or against the upper side of the tool receiving the relevant die in each case. A particularly preferred embodiment of the functional element in accordance with the invention and of the die and of the method to insert this element will now be described with reference to FIGS. 1 to 6.

Figure 1:
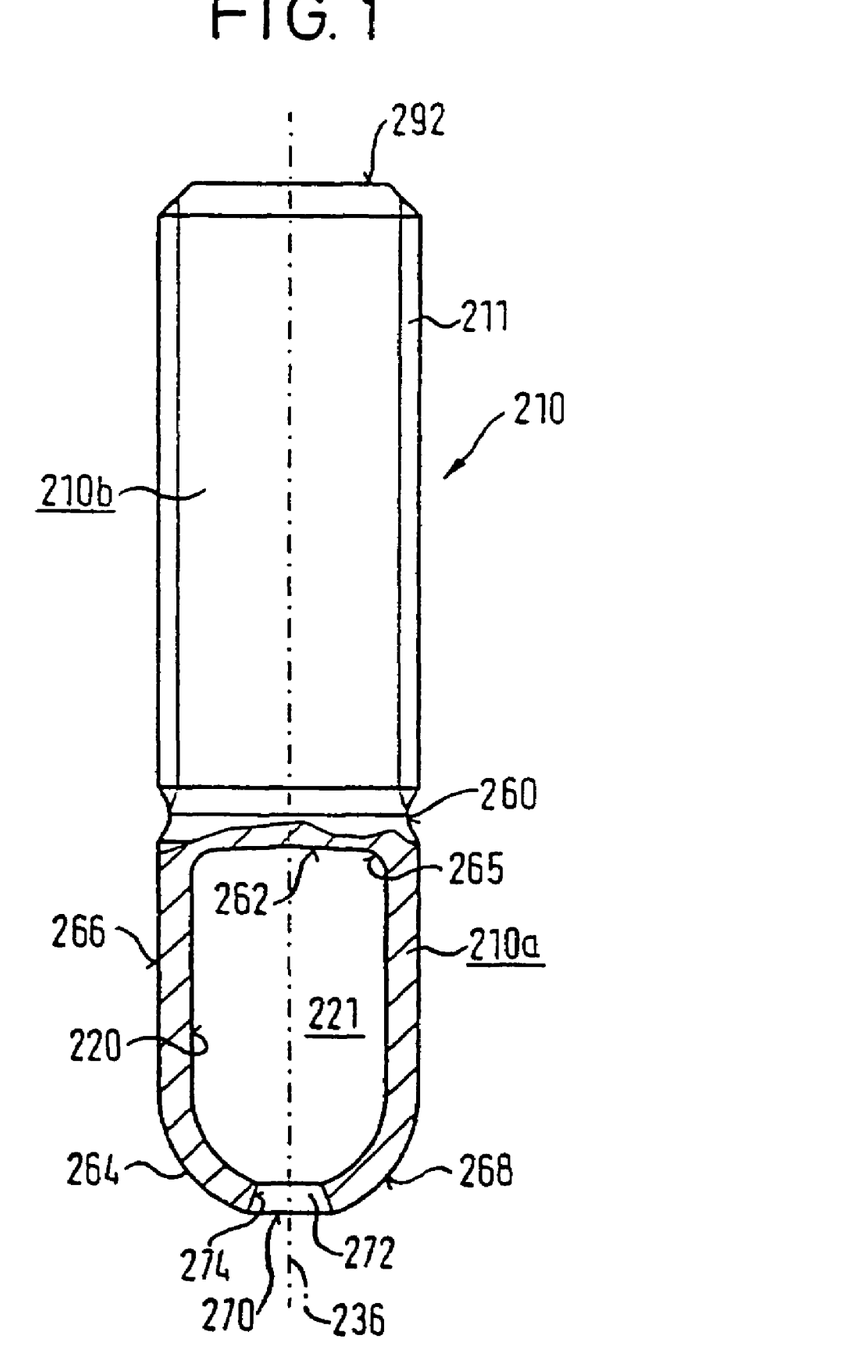
FIG. 1 an embodiment of a functional element, partly sectioned in a longitudinal direction, which can be attached to a sheet metal part by means of the method in accordance with the invention.

FIG. 1 shows first of all a functional element 210, here in the form of a bolt element, with a shaft part 210$b$ having a thread 211 and with a hollow head part 210$a$ having at least substantially the same outer diameter as the shaft part 210$b$. It is pointed out that the shaft part 210$b$ does not necessarily have to be executed with a thread 211, but can, as previously, have a design deviating from this which can be selected as desired to achieve the respectively intended function. The shaft part 210$b$ can, for example, be made as a smooth guide spigot or as a carpet fastening pin with an annular groove allowing a snap connection to a carpet eyelet. It is particularly favourable with this element for, among other possibilities, the shaft part 210$b$ and the head part 210$a$ to have at least substantially the same outer diameters so that the functional element can be made at a favourable cost from bar stock or wire material or from a tubular section.

However, it is not absolutely necessary for the shaft part 210$b$ and the head part 210$a$ to have the same diameter, rather substantial differences in diameter can be present, with this, however, generally meaning a greater effort in the manufacture of the element. In other words, the outer diameter of the shaft part could be larger or smaller than that of the head part.

As can be seen from FIG. 1, the head part 210$a$ has a cylinder bore 220 which forms a circularly cylindrical space 221 and can be made, for example, either by a drill or by a cold forming process. In this example, the space 221 ends in the direction towards the shaft part 210$b$ shortly before the annular groove 260 representing the boundary to the shaft part 210$b$, and indeed in a transverse wall 262 perpendicular to the longitudinal axis, which is made slightly concave, and via smooth radii 265 into the wall 266. Alternatively to this, the transverse wall can have a planar or conical recess 262. However, this is not absolutely necessary. If the member is to be made of tube material, the bore 220 would also extend through the shaft part 210$b$, with, however, the diameter of the bore 220 in the region of the shaft part 210$b$ then preferably being substantially smaller than the diameter of the bore 220 in the head part 210$a$ so that only the head part of the functional element is deformed during the attachment to the sheet metal part 212.

The previously circularly cylindrical annual wall 266 of the head part 210$a$ tapers at the end region 264 remote from the shaft part 210$b$ into a rounded, bullet-like design or cigar shape 268, with the end 270 not being closed, but open, and defining an aperture 272 which is substantially smaller than the diameter of the cylinder bore 220. The end region 264 of the functional element 210 is, so to say, spherically rounded with a flat, open end face 270. As can be seen from FIG. 1, the hollow end region 274 of the element between the end face 270 and the aperture 272 is formed in the manner of a truncated cone, and indeed such that the end region 264 of the head part 210$a$ has an annular, inclined surface 274 at the inside with an included cone angle of approximately 45°. The wall thickness of the hollow region of the head part 210$a$ is at least substantially the same over the total length of this region. The reference numeral 236 indicates the central longitudinal axis of the functional element 210 and it can be seen that the shaft part 210$b$ and the head part 210$a$ are axially arranged relative to one another with respect to this central longitudinal axis 236. Although the head part 210a of the functional element is circular in cross section in this embodiment, it is feasible to select a cross-sectional shape deviating from the circular shape, for example a polygonal shape or a shape with longitudinal grooves or longitudinal ribs, in particular when an even better security against rotation is required in the installed state.

As stated, the functional element 210 can be made of bar stock, wire material or tubular material, and indeed by a rolling process to produce the outer design features of the functional element, optionally in combination with a drilling or boring procedure to make the cylinder bore 220. Alternatively hereto, the element can be produced by a cold forming process or by a high-pressure reforming process, which is particularly possible when tubular material is used as the starting material for the element.

When a high-pressure reforming process is used, the outer design features of the functional element, such as a thread, can be formed by the shaping of the form receiving the tubular section, that is a rolling process to produce the thread would then be superfluous.

Figure 2:
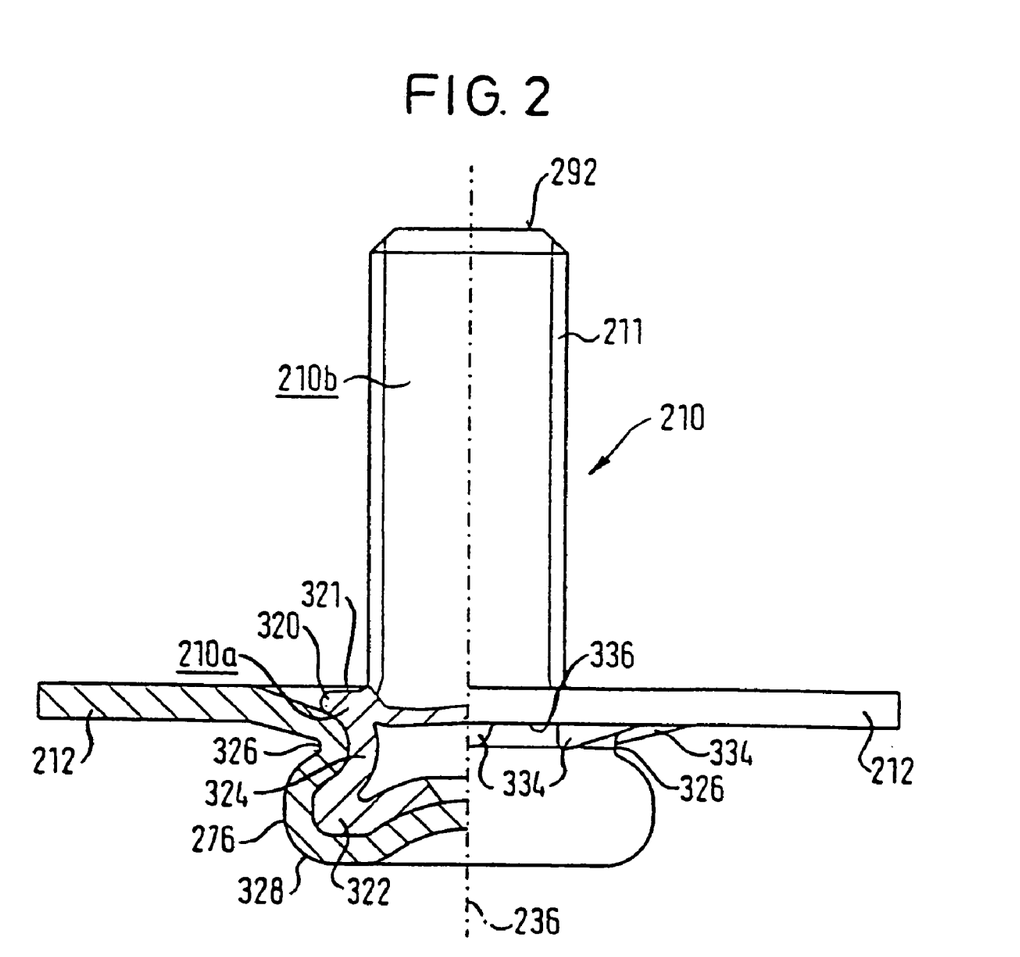
FIG. 2 the functional element of FIG. 1 and the sheet metal part after the attachment of the member to the sheet metal part.

FIG. 2 now shows the functional element 210 in the installed state in the sheet metal part 212. It can be seen that the head part 210a is substantially deformed and is joined in a form-locked manner to a pot-like recess 276 of the sheet metal part 212 formed by the attachment method, with the head part 210a not penetrating the sheet metal part 212, so that a water-tight connection is present in the sense that any water underneath the sheet metal part cannot reach the upper side of the sheet metal part through the sheet metal part around the functional element 210.

The component assembly in accordance with FIG. 2 will be described in more detail below.

Figure 3:
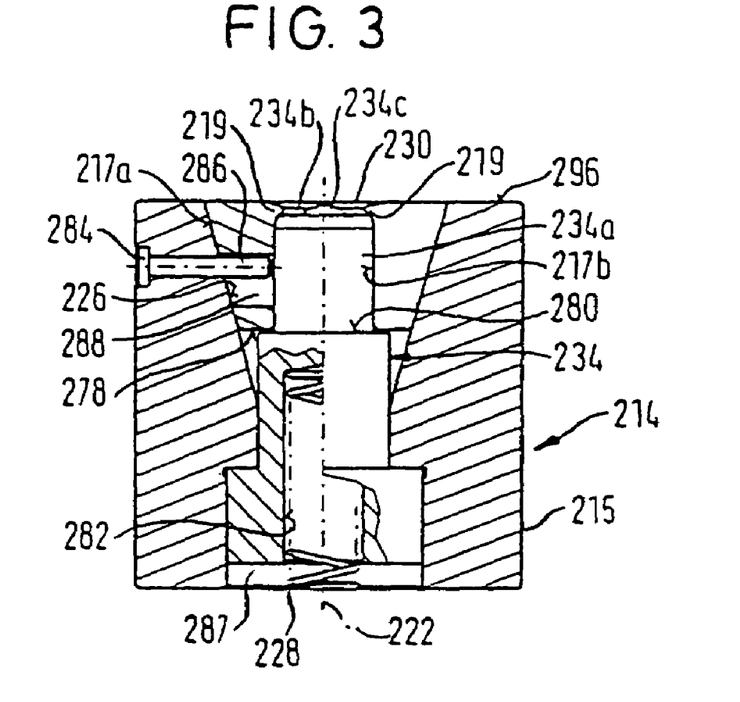
FIG. 3 an embodiment in accordance with the invention of a die for performing the method in accordance with the invention in a representation partly sectioned in a longitudinal direction in accordance with the sectional plane III-III of FIG. 4.
Figure 4:
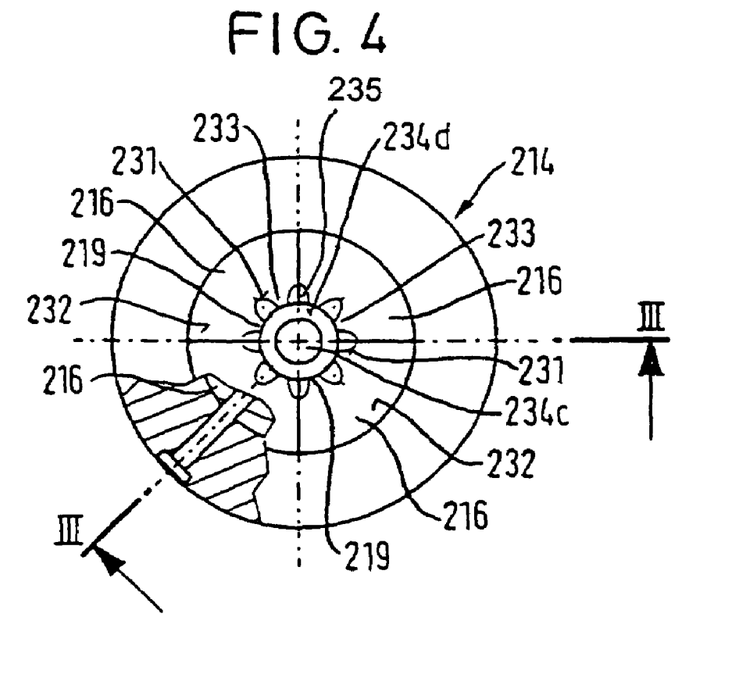
FIG. 4 the die of FIG. 3 in a plan view.

The die in accordance with FIGS. 3 and 4 is used to attach the element to the sheet metal part. As can be seen from FIGS. 3 and 4, the die has four segments or shaped parts 216 which can be moved in the axial direction 222 of the die for removing the sheet metal part once the functional element has been attached.

In FIGS. 3 and 4 the shaped parts 216 each have an inclined, partly conical outer surface 217a which contacts a shaped surface 226 in the form of a truncated cone converging in an inclined manner towards the central longitudinal axis 222, with the shaped parts 216 having a lower side 278 extending perpendicular to the longitudinal axis 222 of the die 214 and arranged directly above an annular shoulder 280 of a centrally arranged abutment element 234, with the abutment element 234 in this example being pressed upwardly in FIG. 3 by a compression coil spring 228. The compression coil spring 228 is namely located in a cylindrical bore 282 of the abutment element 234 arranged coaxially to the longitudinal axis 222 and its one end presses on the closed end of the bore 282 at the abutment element 234 and its other end onto a lower tool of the press, with the die 214 being arranged in said lower tool. Alternatively hereto, the die 214 of FIG. 3 can be provided with a base part at its lower end against which the lower end of the compression coil spring 228 would then be braced. Such a design would have the advantage that the die would then be a unit whose individual parts cannot be lost.

Four pins 284 project through the cylinder wall of the die 214 in the radial direction, with the free end 286 of each pin (only one is shown) projecting into a corresponding recess 288 of the respectively associated shaped part 216. The pins 284 in this way restrict the maximum travel outward of the shaped parts (shown in FIG. 5H) and hold the shaped parts 216 captive and in the desired radial arrangement in the die 214. The width of the respective recesses 288 in the respective shaped parts 216 corresponds at least substantially to the diameter of the respective ends 286 of the pins 284 so that the pins 284 guide the segments or shaped parts 216 when they return from the opened state of the die (in accordance with FIG. 5H) to the closed state in accordance with FIG. 3.

Figure 5A:
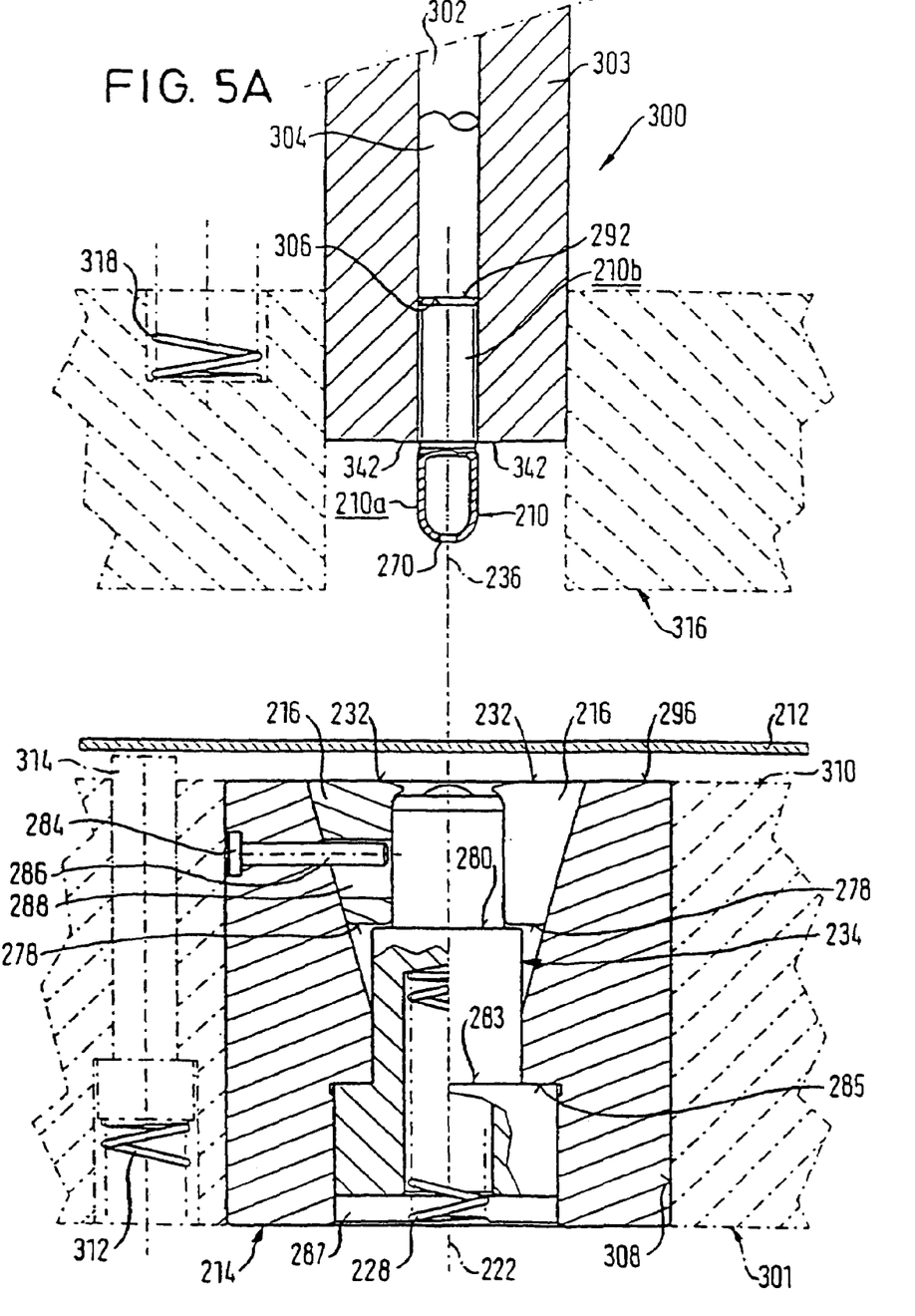
FIGS. 5A-5H a sequence of drawings which represent different stages of the joining method in accordance with the invention and which each show a view sectioned in a longitudinal direction through the functional element arranged in a setting head and through the die in accordance with FIGS. 3 and 4.
Figure 5B:
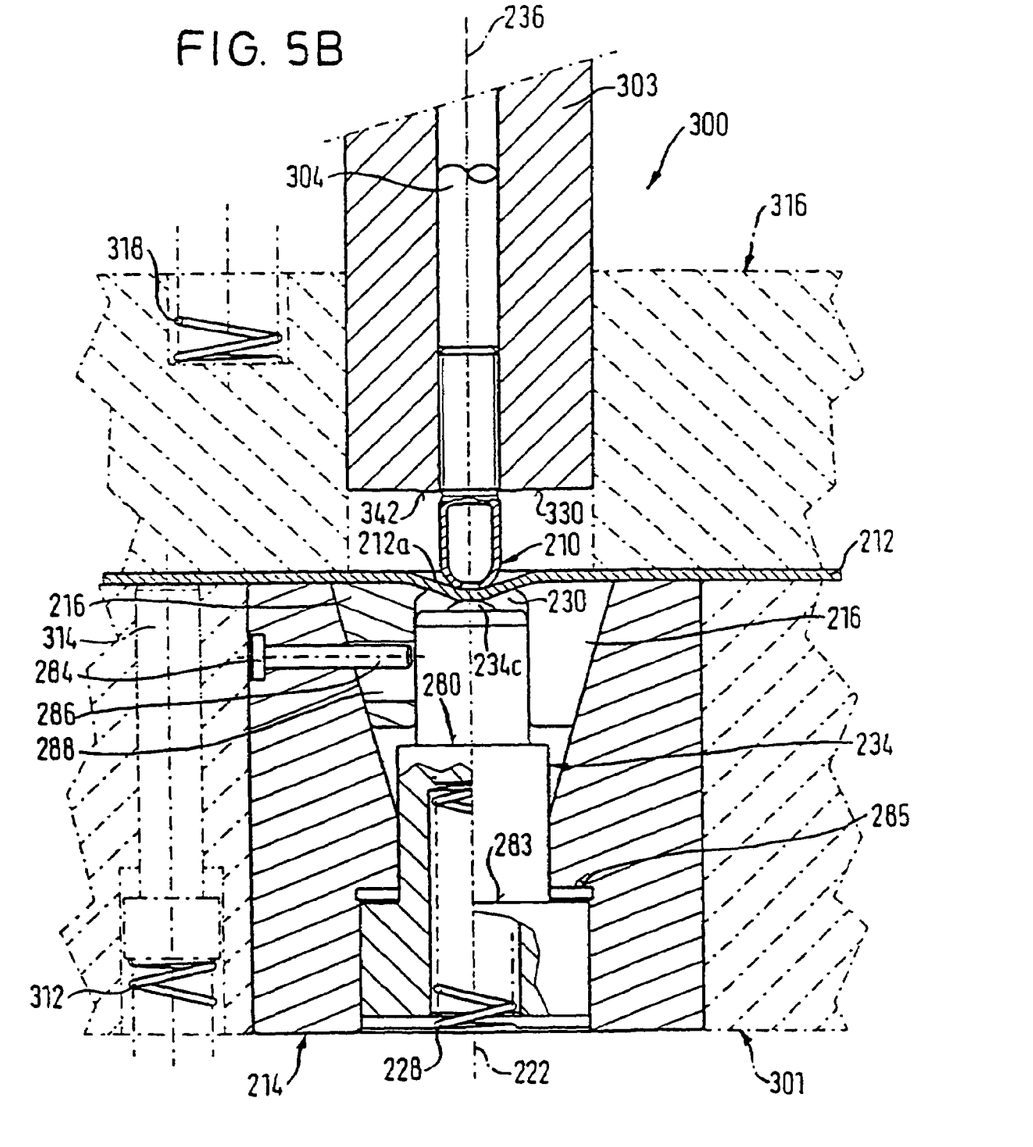
Figure 5C:
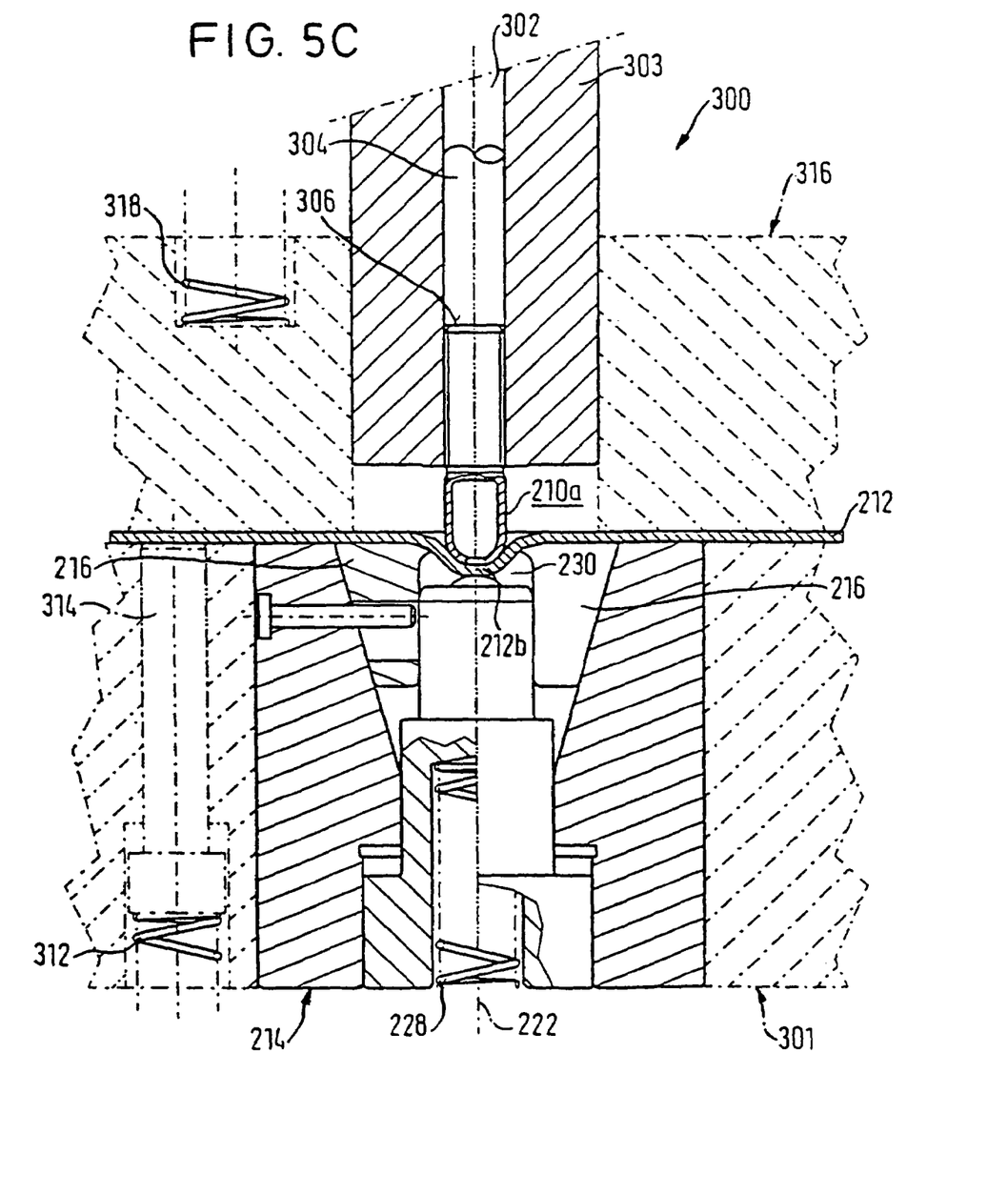

As can likewise be seen from FIGS. 3 and 4, the abutment element 234 has a cylindrically shaped part 234a above the annular shoulder 280 with an end 234b which forms the base of a substantially cylindrical reforming space 230 which is bounded in other respects by the shaped parts 216 (see also FIG. 5C). One notes that in this embodiment the end 234b of the abutment element 234 has a centrally arranged dome-like projection 234c which is surrounded by an annular surface 234d perpendicular to the central longitudinal axis 222.

In the closed state of the die, the radially inwardly directed partly circular cylindrical surfaces 217b of the shaped parts 216 contact the cylindrical outer surface of the upper part 234a of the abutment element. The shaped parts 216 are furthermore each provided in the region of their upper ends with a bead-like or nose-like projection 219, which faces the longitudinal axis 222 and with which sheet metal material of the sheet metal part 212 can be pressed in a manner to be described below into an undercut of the functional element 210 which is formed. In this embodiment, the nose-like projections 219 form the lateral boundary of the reforming space 230. Radially extending grooves 231 are worked into the end face 232 of the shaped part 234a so that noses 233 lie therebetween, with the bases 235 of the grooves 231, which are roughly semi-circular in shape in cross-section, being inclined with respect to the longitudinal axis 222 of the die, as can be seen from FIG. 3. The grooves 231 are generally rounded and, like the noses 233 lying therebetween, serve to provide security against rotation. A total of eight grooves 231 and eight noses 233 are present in this example—a different number would also be possible.

It will now be described with reference to FIGS. 5A to 5H how the functional element 210 can be attached to a sheet metal part 212 using the die 214.

FIG. 5A shows the starting state in which the die 214 is located in the lower tool (301) of a press, a sheet metal part 212 is arranged above the die and the shaped part 210 is held in a schematically represented setting head 300, for example by an angular spring (not shown) made of plastic which ensures frictional contact between the shaft part 210b of the functional element 210 and a bore 302 of an outer plunger 303 of the setting head. One notes that the longitudinal axis 236 of the functional element 210 is aligned with the longitudinal axis 222 of the die 214 and, at the same time, the central axis of the bore 302 of an outer plunger 303 corresponds to that of the setting head 300. One notes also that all shaped parts 216 are in their lower position in accordance with FIG. 3, that is the die 214 is closed in the starting position. The upper boundary of the respective recesses 288 of the shaped parts 216 lies directly—at a small distance—above the respective ends 286 of the respective pins 284. This position arises due to the force of gravity and the guidance by the pins 284. The compression coil spring 228 presses the abutment element 234 upwardly so that the annular shoulder 283 of the abutment element 234 contacts an annular shoulder 285 of a stepped bore 287 of the die 214 and the annular shoulder 280 of the abutment element 234 is arranged directly beneath the lower surface 278 of the respective shaped parts 216.5 A plunger insert 304 is located in the outer plunger 303 of the setting head 300 and its lower end 306 presses onto the upper end 292 of the shaft part 210b of the functional element 210. Although the plunger insert or inner plunger 304 is movable with respect to the outer plunger 303 in the direction of the longitudinal axis 236, it has reached its lowest position with respect to the outer plunger 303 in FIG. 5A and in the further FIGS. 5B to 5G. However, it can be drawn axially upwardly with respect to the inner plunger in order to receive a new functional element 210, as will be described below in more detail in connection with FIG. 6.

The die 214 is here located in a bore 308 of the lower tool 301 of a press, the upper side 310 of said tool 301 being arranged flush with the end face 296 of the die and of the end faces 232 of the shaped parts 216. A plurality of stripper pins 314, which are upwardly biased by springs 312, are located in the lower tool 301 and support the sheet metal part 212 in its introduction into the press; however, they can be pressed downwardly due to the force exerted by a hold down member 316 of the setting head 300 when the press is closed so that the sheet metal part 212 comes into contact with the end face 296 of the die 214 and with the upper side 310 of the lower tool 301 in the region of the die and is immovably clamped therebetween the hold down member 316 and the die 214 or the lower tool 301.

Three such spring-biased stripper pins 314 can, for example, be provided which are arranged, for example, at equal annular intervals around the central longitudinal axis 222, with only the one stripper pin 314 being visible due to the sectional drawing.

The hold down member 316 is also biased in the direction towards the sheet metal part 212, and indeed by springs 318 which—like the spring 312—are here indicated schematically as compression coil springs, even though other spring types can also be used which are very well-known in tool making.

In this example, three springs 318 are likewise arranged at equal annular intervals around the central longitudinal axis 222 so that the hold down member 316 is pressed evenly downwards under the force of these springs.

FIG. 5B shows the first step of the joining method in which the setting head 300 has moved downwardly towards the die 214 in comparison with the representation of FIG. 5A due to the closing movement of the press, so that the hold down member 316 has immovably clamped the sheet metal part 212 between it and the upper side 310 of the lower tool 301 and the upper side 296 and 232 of the die and the shaped parts 216. The stripper pins 314 have been pressed downwardly against the force of the spring 321 until their upper ends are flush with the upper side 310 of the lower tool. The end 270 of the functional element 210 has pressed the sheet metal part 212 onto the dome-like projection 234c.

The plunger 304 has further pressed the end 270 of the functional element 210 and the sheet metal material into the reforming space 230 and thus moved the abutment element 234 slightly downwardly against the force of the spring 228 so that the reforming space 230 has become deeper. In doing so a recess 212a is formed there in the sheet metal part 212. The annular shoulder 280 moves away from the lower side 278 of the shaped parts 216 and the annular shoulder 283 likewise moves away from the annular shoulder 285. The force which is exerted on the sheet metal part 212 via the setting head and the functional element does not result in a movement of the shaped parts 216 as these always remain in the same position up to the completion of the attachment of the functional element to the sheet metal part 212. As the press continues to close, the inner plunger 304 and the outer plunger 303 move lower with respect to the hold down member 316 and in so doing press the abutment element 234 into its lowest position in accordance with FIG. 5C, with the recess 212a in the sheet metal part becoming deeper.

As the closing movement of the press continues, the recess 212a of the sheet metal part 212 becomes wider at its lower end without any axial escape movement of the shaped parts 216 taking place, until finally the sheet metal part 212 is clamped between the dome like projection 234c of the abutment element 234 and the end 270 of the head part 210a of the functional element 210, with the dome like projection 234c generating a dent 212b directed slightly upwardly in the sheet metal part so that this is slightly pressed into the aperture 270 at the end of the functional element.

Figure 5D:
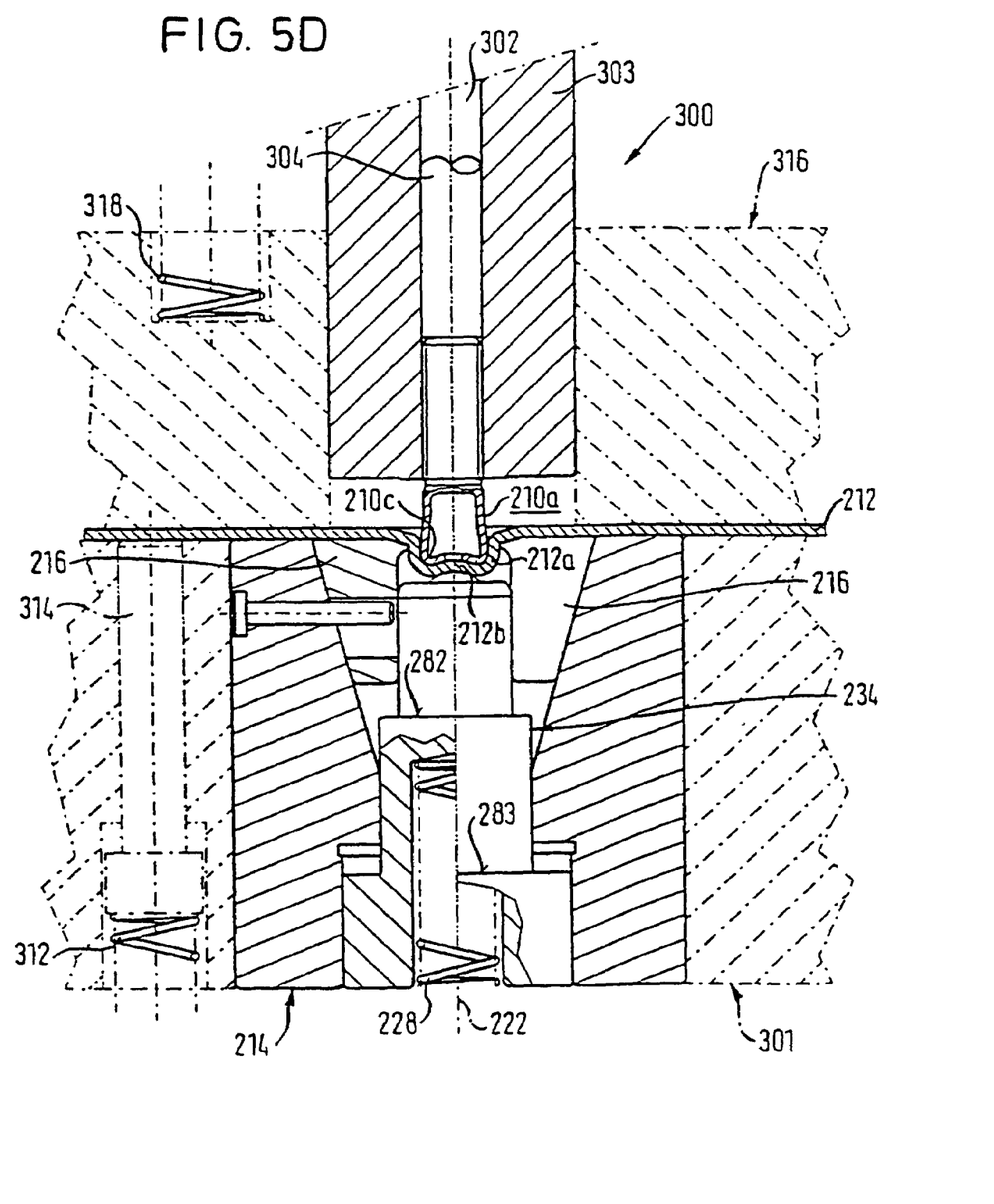

In a further stage of the closing movement of the press, the force exerted on the head part 210a of the functional element 210 results in a deformation of its lower end so that the form is produced which is shown in FIG. 5D. It can be seen that the sheet metal part 212 has laid itself around the rounded edges of the nose-like projections 219, that the end 270 of the head part 210a of the functional element has partly laid the sheet metal part around the dome like projection 234c at 212b and that during these deformations the end of the head part 210a is itself deformed so that the functional element is expanded slightly radially outwardly in the region of its lower end, while the region around the previous end face 270 has been deformed axially inwardly and the aperture 272 is now located in a con-cave region 210c of the head part 210a.

Figure 5E:
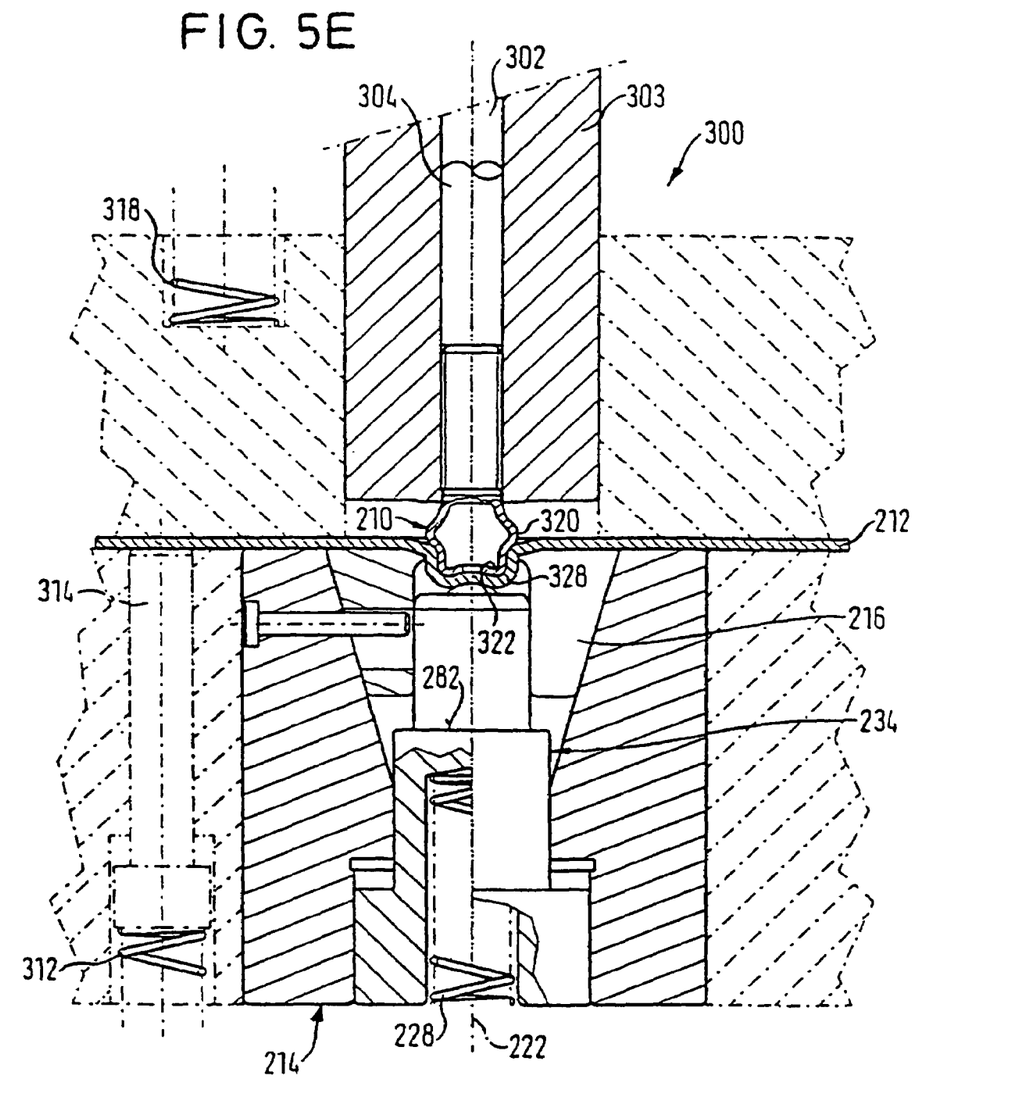

The representation of FIG. 5E is similar to the representation of FIG. 5D, but here a more advanced deformation of the sheet metal part 212 can be seen.

The lower end of the outer plunger 303 of the setting head 300 of the die 214 has further approached the sheet metal part 212. It can be seen in FIG. 5E that the cylindrical wall region of the head part 210 has now been compressed such that a bulge 320 projecting radially outwardly has formed due to a folding of the cylindrical wall region. It can also be seen that a further pronounced annular fold or annular bulge is present at the point 322 where the axially directed wall of the head part 210a merges into the radially inwardly directed region 212b which is formed from the former end region 264 of the head part 210a.

Figure 5F:
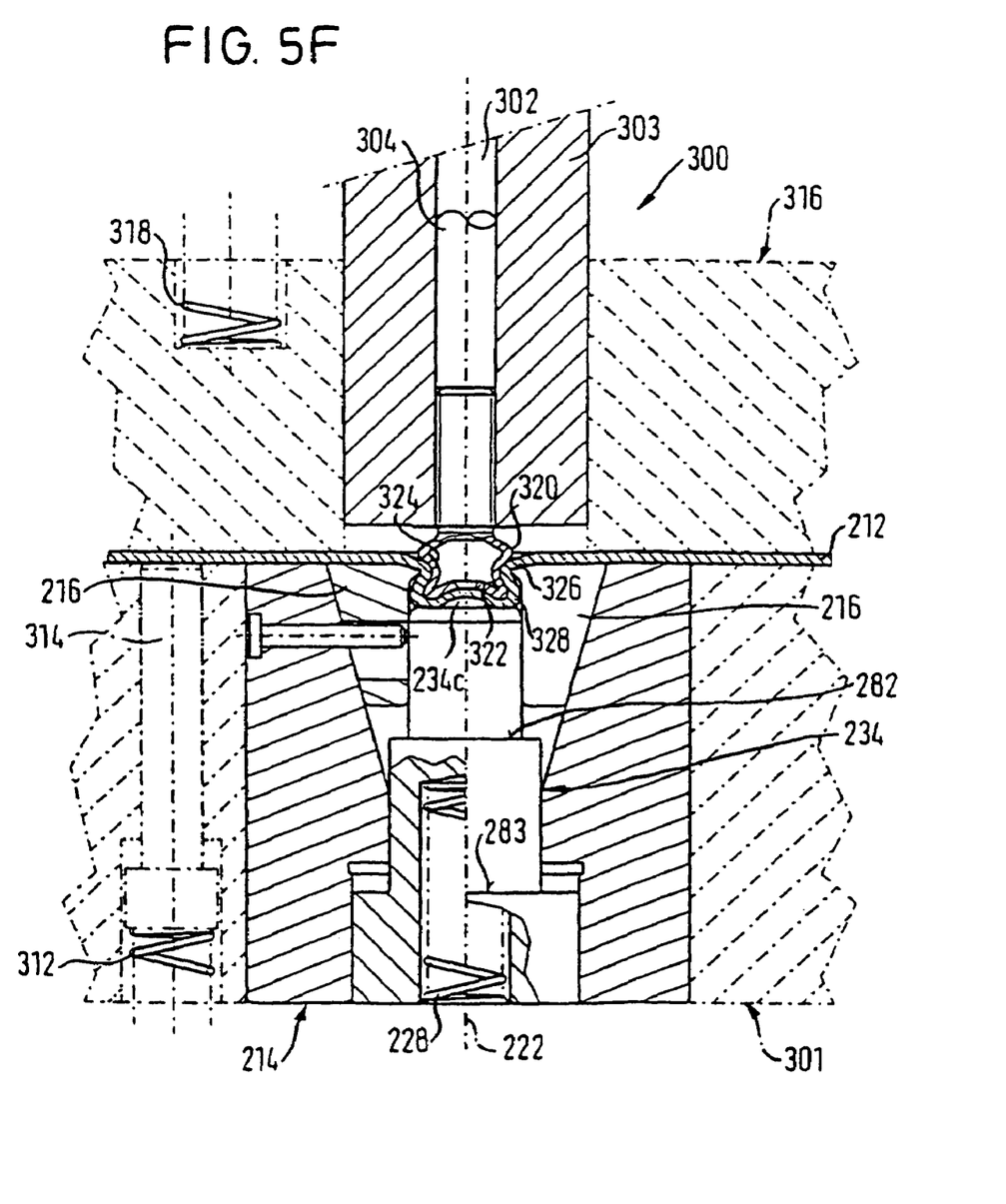

On reaching the state in accordance with FIG. 5F, the compression of the head part 210a of the functional element 210 is now so large that the annular fold at the point 322 has now moved beneath the radially inwardly directed projections 219 of the shaped parts within the deformation space 230 and the sheet metal part 212 has bent correspondingly around these projections. Furthermore, the lower end of the head part 210a has pressed the sheet metal part against the annular shoulder 234d of the abutment element so that the deformation space 230 is almost completely filled. The annular fold 320 is even more pronounced in comparison with FIG. 5E and the annular fold 326 of the sheet metal part 212 around the projections 219 is already trapped in the radially inwardly directed annular bulge 324 being formed between the annular fold 320 and the annular fold 322.

The further annular fold 328 of the sheet metal part in the region of the transition from the wall of the cup-like recess in its base region follows the annular fold 322 of the head part 210a of the functional element so that a form-locked joint is also present here between the sheet metal part and the functional element. The lower end 330 of the outer plunger has further approached the die 214 in the state of FIG. 5F.

Figure 5G:
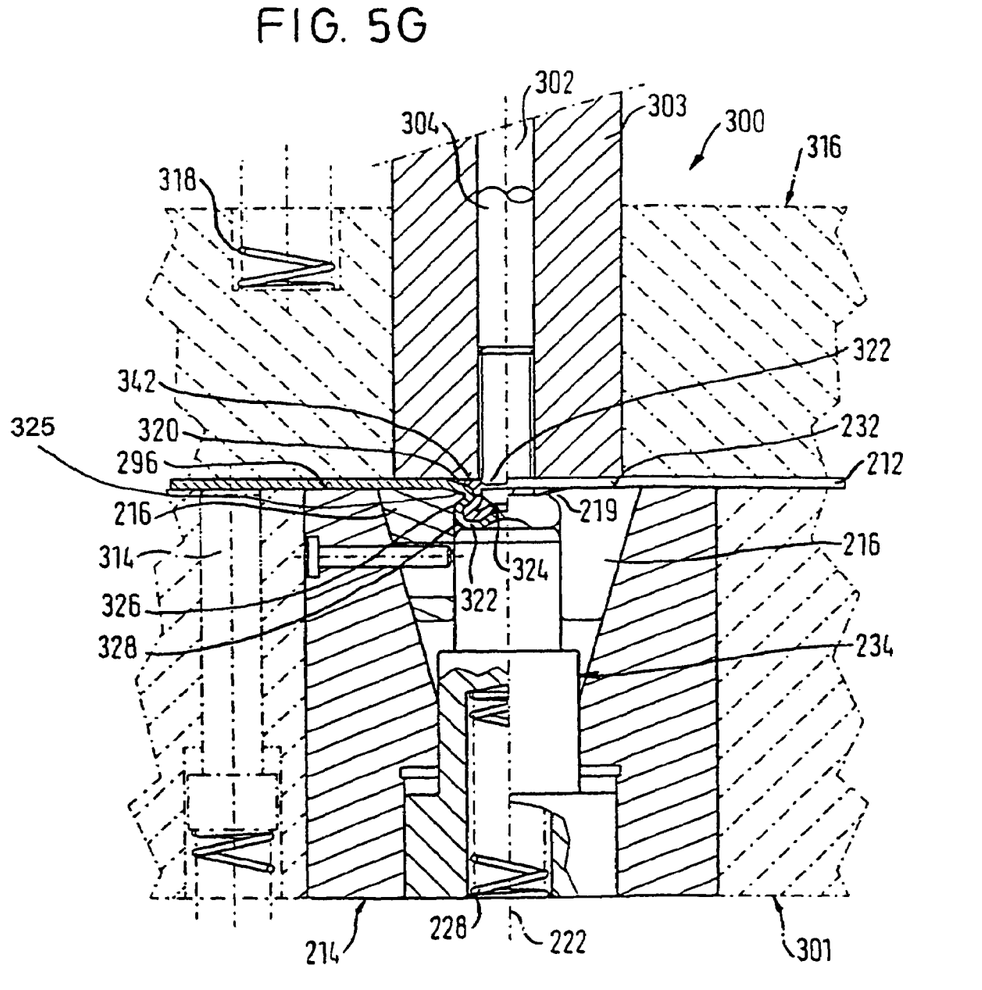

The closing movement of the press continues until, as shown in FIG. 5G, the closed state of the press is reached, the sheet metal part 212 is completely captured between the end of the outer plunger 303 of the setting head 300 and the end 296 of the die 214 adjoining it or the ends 232 of the shaped parts 216. The result of this further compression movement is that the annular undercut 324, in which the annular ring fold 325 of the sheet metal part is fixedly clamped, has formed completely between the annular folds 320 and 322 in the region of the bulge-like projections 220. Furthermore, the annular fold 322 of the head part 210a is fixedly clamped within the annular fold 328 of the sheet metal part. The plunger projection 342 at the end 330 of the outer plunger 303 has compressed the annular fold 320 such that the two material layers of the annular fold 320 and/or the annular bulge formed thereby fixedly contact one another, with the upper side 321 (see FIG. 2) of the annular fold 320 being located beneath the plane of the flat sheet metal part 212.

The compression caused by the plunger projection 342 has also resulted in the sheet metal of the sheet metal part being formed into the recesses 231 of the shaped parts 216, while the noses 233 therebetween have penetrated into the sheet metal part. This deformation of the sheet metal part 212 leads to a corresponding deformation of the material of the ring fold 320 so that an intermeshed engagement is present in this region between the sheet metal material and the material of the head part 210a of the functional element which serves as security against rotation. Where the shaped parts 216 have recesses 231, the completed component assembly has noses 334 which can be seen best in FIG. 2, but also in FIG. 5H. Recesses 231 are located therebetween which are formed by the noses 233 of the shaped parts. An intimate connection has therefore taken place in the region of the head part 210a so that the form-locked joint to the sheet metal part is a really secure joint, that is both secure against rotation and secure against forces acting in an axial direction.

Figure 5H:
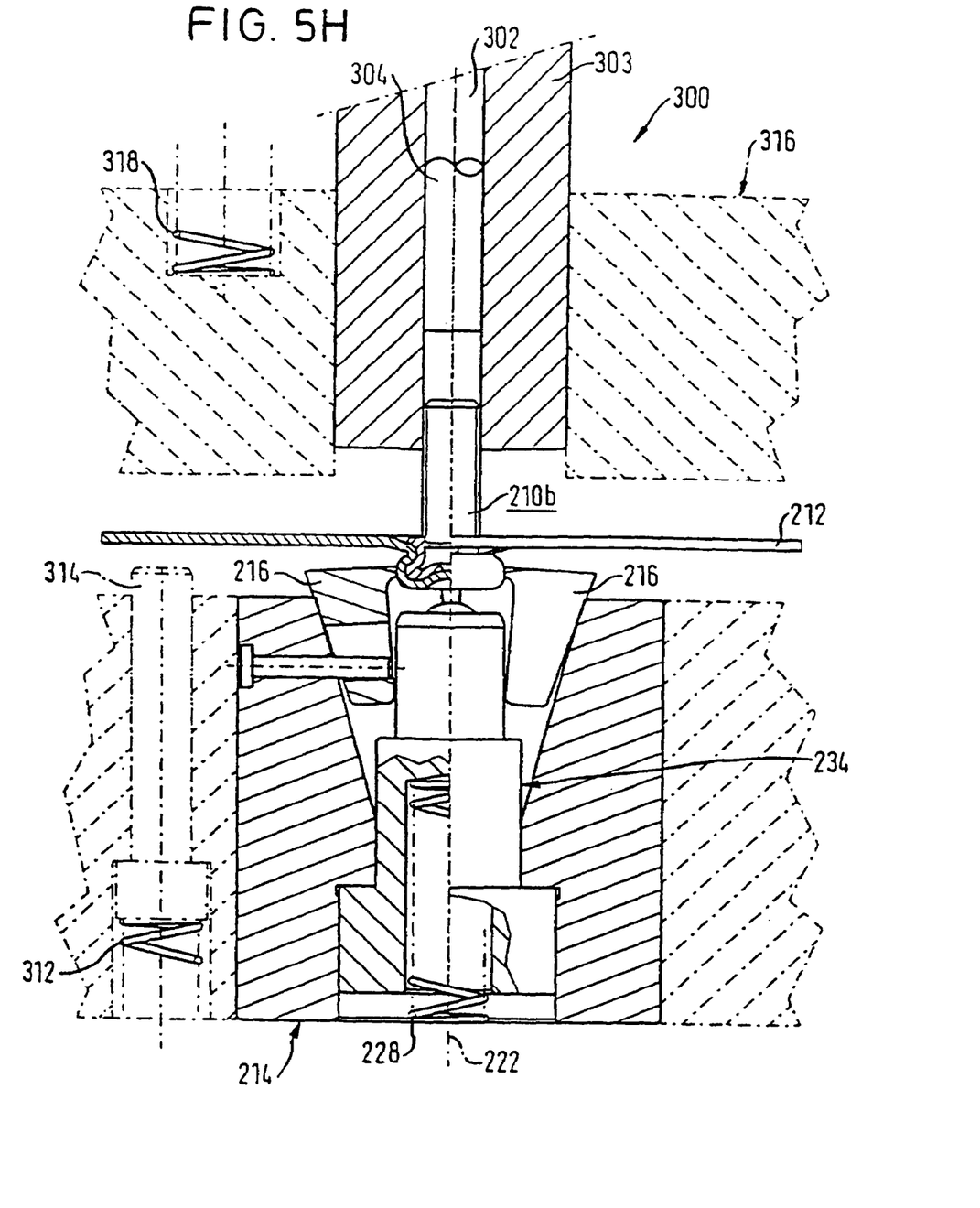

When the state in accordance with FIG. 5G has been reached, the press opens and moves to the state in accordance with FIG. 5H. The component assembly (210+212) can now be removed. When the press opens, the shaped parts 216 move up and pivot outwardly under the effect of the spring 312 and of the stripper pins 314 and/or of an engagement between the setting head 300 and the shaft part 210b so that the open starting position of the die is reached. After the component assembly has been removed, the shaped parts fall back into the starting position of FIG. 5A, the cycle just described is repeated with a new functional element 210 and a new sheet metal part 212. The press is opened so far that the component assembly formed in this way, which is shown alone in FIG. 2 to a large scale, can be removed from the press or transported to the next station in the progressive tooling, if such is used. When the press is opened, the abutment element 234 returns to the position of FIG. 5A due to the force of the spring 228. Although the springs 228, 312 and 318 are shown here as compression coil springs, they can be replaced by different springs, for example by fluid pressure springs, which are well known per se.

If, as mentioned above, the functional elements 210 are provided with a non-circular cross-section in the region of the head part 210a, for example with a polygonal cross-section or with ribs and/or grooves, the method is carried out exactly as described above. The sheet metal material is joined intimately and in a form-locked manner to the outer form of the head part, whereby increased security against twist-out is to be expected. With such a design, care must be taken that the features of shape on the outer side of the head part 210a are not so pronounced that they impermissibly damage the sheet metal material. Here, too, an adhesive could be used, for example a pressure-sensitive adhesive which is applied to the head part 210a of the functional element and activated under pressure and which leads to a bonded joint between the sheet metal part and the functional element.

It is moreover possible to pre-pierce the sheet metal part at the point of application of the functional element, whereby the edge of the piercing will come to rest between the folds 320 and 322. The piercing could also be performed such that when the functional element is made as a nut element, which is generally possible, an electrically conductive connection, i.e. a connection to earth in accordance with German patent application 198 48 617.0, can be achieved. To realize a nut element, it would only be necessary to make the shaft part 210b hollow and to provide it with an internal thread, which can be done before or after the attaching to the sheet metal part, for example subsequently by means of a thread-forming or thread-cutting screw. In the embodiment as a nut element, the corresponding screw can be screwed into the element either from the shaft part side of the metal sheet part or from the opposite side of the sheet metal part.

Figures 6A, 6B, 6C:
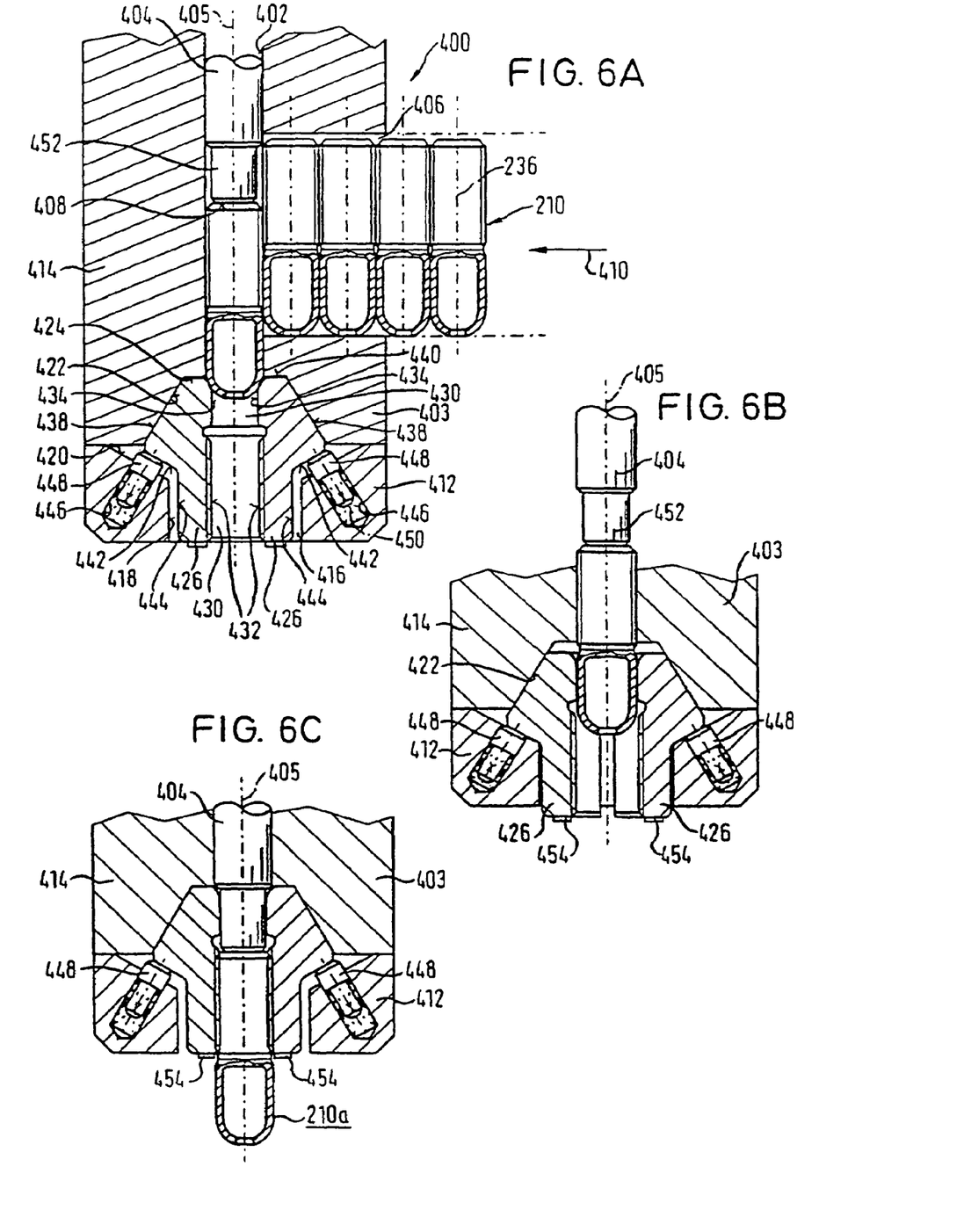
FIGS. 6A-6C a sequence of drawings to explain a particularly preferred embodiment of a plunger arrangement in accordance with the invention.

FIG. 6A now shows a possible plunger arrangement 400 in detail which can be used advantageously in place of the plunger arrangement 303, 304 in accordance with FIG. 5.

The outer plunger 403 is provided with a plunger passage 402 which is arranged coaxially to the longitudinal axis 405 and displaceably receives the inner plunger 404. A supply passage 406 is shown on the right-hand side of the sectional drawing in accordance with FIG. 6A through which functional elements 210 are led from a feed device (not shown) into the plunger passage formed by the bore 402. One notes that the longitudinal axes 236 of the individual functional elements are parallel to the longitudinal axis 405 of the plunger passage 402 and that the individual functional elements are arranged in rows contacting one another. However, due to the dimensions of the plunger passage 402, only one functional element 210 at a time can be located in the plunger passage 402.

When the press is opened, the outer plunger 403 is displaced downwards 5 with respect to the inner plunger 404, usually under the pressure of a corresponding spring (not shown), until the end face 408 of the inner plunger 404 approximately reaches the level of the upper boundary of the supply passage 406 so that a functional element 210 can be inserted into the plunger passage 402 by pressure in the direction of the arrow 410.

The outer plunger 403 is made in a plurality of parts in this embodiment and comprises a lower annular part 412 which is fastened to an upper part 414 by screws (not shown). The lower annular part 412 has a central aperture 416 with an annular wall 418 of circularly cylindrical shape which merges into a conical region 420. Both the annular wall 418 and the conical region 420 are arranged concentrically to the longitudinal axis 405. The upper part 414 of the outer plunger 403 is provided with a conical recess 422 which merges into the plunger passage 402 via an annular shoulder 424. The conical region 422 and the annular shoulder 424 are also arranged concentrically to the longitudinal axis 405 of the plunger arrangement.

In this example, three segments 426, which are arranged at equal annular intervals around the central longitudinal axis 405, are located in the region between the upper part 414 and the lower part 412 of the plunger arrangement 403. The three segments 426, of which only two can be seen in FIG. 6, together form a receiver 430 arranged coaxially to the longitudinal axis 405 for a respective functional element 210. The lower surfaces 432 of the segments 426 pointing radially inwards are made as a segment of a thread cylinder which is designed to be complementary to the thread cylinder 211 of the shaft part 210b of the functional elements 210. The upper surfaces 434 of the segments 426 pointing radially inwards together form a passage 436 having a diameter which is somewhat smaller than the outer diameter of the head part 210a of the respective functional elements 210. The radially outer surfaces 438 of the segments 426 are designed as partly conical surfaces which are complementary to the conical surface 422 of the corresponding recess of the upper part 414 of the outer plunger 403. The axially upper surfaces 440 of the segments 426 are designed complementary to the annular shoulder 424 so that in the position of FIG. 6A, the partly conical surfaces 438 of the segments 426 and the partly circular surfaces 440' fully contact the respective opposing surfaces of the outer plunger 403, that is the conical surface 422 and the annular shoulder 424. In this position, the through passage 436 formed by the segments 426 and concentric to the longitudinal axis is made such that it is smaller in diameter than the outer diameter of the head part 210a of the functional element 210. The respective functional element 210 can thus initially not fall between the segments 426, but is rather supported at the upper end of the segments 426 as is shown in FIG. 6A.

The upper region of the respective segments 426 merges into a partly cylindrical wall part 444 via a partly conical surface 442. The partly conical surfaces 442 of the segments 426 are opposite the conical surface 42 of the lower part 412 of the plunger arrangement 400 in the position in accordance with FIG. 6A and are spaced from this surface 420. The partly cylindrical surfaces 444 of the segments 426 are opposite the partly cylindrical surface 418 of the lower part 412 of the plunger arrangement 400 and are radially spaced therefrom in each case.

To ensure that the segments 426 always return to the centered starting 5 position of FIG. 6A, tappets 448 biased by springs 446 are provided whose axes 450 are inclined with respect to the longitudinal axis 405 of the plunger arrangement 400 and perpendicular to the conical surface 420 of the lower part 412 of the plunger arrangement 400. The spring bias causes the tappets 448 to be pressed against the partly conical surfaces 442 of the segments 426 contacting them directly such that when the press is open, these always assume the position shown in FIG. 6A. The spring bias is not very strong.

If the press is now closed, the inner plunger 404 is pressed downwards with respect to the outer plunger 403 and in this process presses the respective functional element 210 located in the plunger passage 404 against the upper end face 440 of the segments 426. As a result of the sloped entrance to the passage 436 and the correspondingly inclined outer surface in the region of the lower end face 270 of the respective functional element 210, the force exerted on the inner plunger 404 is sufficient to press the segments downwards in the axial direction 405 and radially outwards so that they press the tappets 448 downwards until the partly conical surfaces 442 come into contact with the conical surface 420 of the lower part 412 of the outer plunger 403. The radially outwardly directed movement of the segments 426 causes the inner diameter of the passage 436 bounded by these segments to increase so that the respective functional element located in the plunger passage 402 is pressed into the passage between the segments 426 under the force of the inner plunger 404. An intermediate stage of this movement is shown in FIG. 6B, and this movement subsequently continues until the upper shaft part 210b of the respective functional element 210 provided with an external thread is located in the lower region of the segments 426. These then move radially inwardly and upwardly under the force of the spring 446 biasing the tappets 448 until the part turns in the radially inwardly directed lower surfaces 432 of the segments 426 engage in a form-locked manner into the thread cylinder 211 of the functional element 210. This situation is shown in FIG. 6C and it can be seen that the front section 452 of the inner plunger 404, which has a smaller outer diameter than the upper part of the inner plunger 404, is arranged in a form-locked manner inside the passage 436 formed by the segments 426. The functional element 210 in FIG. 6C has now reached a position which is comparable to that of FIG. 5A, and the punching process to insert the element can now begin and runs in accordance with FIG. 5.

Although not shown in FIG. 6A, the arrangement is made such that the inner plunger 404 cannot move any further downwards than as shown in FIG. 6C. This can, for example, be prevented by the upper part of the inner plunger 404 being provided with a head (not shown) which has come into contact with the outer part 403 of the plunger in its "lowest" position in accordance with FIG. 6C. The force of the press is now transferred via the inner plunger 404 to the end face 292 of the functional element 210 and via the outer plunger 403 and the segments 426 to the thread 211 of the functional element. It is ensured in this way that the thread cannot be damaged as it is received in a form-locked manner inside the complementary thread parts of segments 426 so that the thread cylinder cannot be compressed. If the shaft part 210b of the functional element is intended to be made hollow, the cylindrical projection 452 of the inner plunger 404 can be designed accordingly arid can extend via an annular shoulder (not shown) pressing onto the end of the functional element 210 into the inner bore of the shaft part so that the pressing forces can be transmitted to the functional element 210 without any damage to this element by the pressing together of the walls of the hollow shaft part needing to be feared, as this element is supported by the extended projection of the inner plunger.

It should be pointed out at this point that the number of segments 426 is 10 not limited to three. The minimum number required to realize this embodiment is two; however, three, four or more such elements can also be used, with preferably one respective tappet 448 with bias spring 446 being provided for each member.

The lower ends of the segments 426 can, if required, be provided with noses 454 which jointly form the plunger projection 342 of FIG. 5.

After the attachment of the functional element 210 in accordance with the drawing sequence of FIG. 5, the press opens again, whereupon either the sprung hold down member 316 and/or the shaped parts 216 exert a force on the sheet metal part 212 with the attached functional element 210, with said force being sufficient to draw the segments 426 downwards into the position of FIG. 6B in order to release the shaft part 210b. As the spring tension of the spring 446 is small, the release of the functional element when the press is opened is carried out without damaging the respective functional element 210 just attached.

After the release of the functional element 210 just attached, the opening of the press further results in the outer plunger 403, which is biased downwards by the spring force, being pressed downwards, while the inner plunger 404 is drawn upwards until it reaches the starting position where the lower end face 408 of the inner plunger 404 has reached the level of the upper boundary of the passage 406, whereby a new element is introduced into the plunger passage 402 by the pressure in the direction of the arrow 410. The working cycle then begins afresh with a new sheet metal part and with a new functional element 210, namely the functional element that is now located in the plunger passage 402.

Although the abutment element 234 is shown and was described as movable in FIGS. 3 to 5, this is not absolutely necessary. The abutment element 234 could instead have a fixed position within the die 214 which would correspond to the lowest position in accordance with FIGS. 5D, 5E, 5F and 5G.

The tool arrangement can be a station in progressive tooling where a strip of sheet metal is led through a plurality of stations to carry out a plurality of operations. The tool arrangement can, however, also be used in a punching press which manufactures a single part for every stroke. The attachment of the tool arrangement to a robot or another kind of tool is also possible.

Although the segments 426 are preferably provided with features of shape which engage into corresponding form features on the shaft part of the functional element, this is not required for some applications. The segments could, for example, have a purely partly cylindrical surface which would be sufficient with a solid shaft part to hold the corresponding functional element by frictional contact. The plunger arrangement can furthermore be used in setting heads which are used for the attachment of other functional elements.

The functional elements described here can, for example, be made of all materials which reach the strength class 5.6. Such metal materials are usually carbon steels with a carbon content of 0.15 to 0.55%.

In all embodiments, all materials can also be named as examples for the material of the functional elements which reach strength values of Class 8 of the ISO standard in the context of cold forming, for example a 3532 alloy in accordance with DIN 1654. The fastening elements formed in this way are suitable, among other things, for all commercial steel materials for sheet metal parts capable of being drawn as well as for aluminium or their alloys. Aluminium alloys, in particular such with a high strength, can also be used for the functional elements, e.g. AlMg$_5$.

The trials carried out up to now have shown that when the material 3532 is used, the ratio of the radial wall thickness of the head part to the outer diameter of the head part is in the region of between 0.15 and 0.2. Higher values are desired as they increase the yield forces and the pull-out forces. However, it must be ensured that the pressing-in forces do not lead to an impermissible deformation. With a diameter of 8 mm, a radial thickness of 1.2 mm has proved to be favourable.

I claim:

1. A method for the attachment of a functional element (210) to a sheet metal part (212), wherein the method of attachment is one of liquid-tight attachment and gas-tight attachment, wherein the functional element (210) is provided with a hollow head part (210a) is pressed against the sheet metal part (212) supported by a die (214), wherein said hollow head part (210a) is deformed and said sheet metal part (212) is simultaneously formed into a cylindrical forming space (230), which has a base and is defined by shaped parts (216) of the die, wherein material of said sheet metal is formed into an undercut (324) made by deformation of the head part (210a), with the shaped parts being immovably held during the forming of said sheet metal part into said forming space, but being partly lifted out of the die for the removal of the functional element attached to the sheet metal part.

2. A method in accordance with claim 1, wherein said shaped parts have radially inwardly projecting noses (233) bounding part of said cylindrical forming space and wherein material of said sheet metal is brought into engagement with said noses (233) adjacent to said material of said sheet metal part by the press force applied to the functional element (210) during the forming of said sheet metal part into said forming space and wherein both the sheet metal part (212) and the region of the head part (210a) above the sheet metal part are deformed thereby to form a security against rotation.

3. A method in accordance with claim 2, wherein said shaped parts have radially inwardly extending grooves between said noses and wherein material of said sheet metal part is brought into engagement with said grooves (231).

4. A method in accordance with claim 1, wherein the material of said sheet metal is first pressed into the undercut (324) and preferably brought into engagement with the shaped features forming the security against rotation after the sheet metal part (212) has been at least partly formed into the forming space (230) by the functional element (210) moved in the direction of a longitudinal axis (222) of the die (214) for the attachment to the sheet metal part.

5. A method in accordance with claim 1, wherein the sheet metal part (212) is not pierced, at least in the region of the functional element (210) during its attachment to the sheet metal part (212).

6. A method in accordance with claim 1, wherein the shaped parts (216) are arranged in segment-like manner around an abutment element (234), which has a projection (234c) of dome shape, the shaped parts together with the projection bounding the forming space (230), with the deformation of the hollow head part (210a) of cigar shape being partly carried out by means of said projection (234c).

7. A method in accordance with claim 1, wherein the die has a conical seat and the shaped parts (216) are partly lifted out of said conical seat and pivoted radially outwardly to release a component assembly comprising the sheet metal part (212) and the functional element (210).

8. A method in accordance with claim 1, wherein the hollow head part (210a) of the functional element, is formed into one of two annular folds spaced form one another by the undercut (324) and two annular bulges (320 and 322) spaced from one another by the undercut (324).

9. A method in accordance with claim 8, wherein the sheet metal material of the sheet metal part, which protrudes into the undercut (324), is formed as one of an annular fold and an annular bulge (326).

10. A method in accordance with claim 9, wherein the material of said sheet metal part, which is formed into the cylindrical forming space, surrounds the deformed head part (210a) of the functional element (210).

11. A method in accordance with clam 10, wherein said sheet metal part (212) formed into said cylindrical forming space has a base region, said base region being given a convex shape facing towards a shaft part of the functional element.

12. A method in accordance with claim 10, wherein the annular fold (322) of the head part (210a) of the functional element (210) adjacent to the base region is formed into a corner region of the cylindrical forming space of the sheet metal part (212), said corner region being formed between said base region and a side wall of the cylindrical forming space.

* * * * *